March 22, 1955   J. G. SWEET   2,704,839
SIGNAL LIGHT
Filed Feb. 1, 1952   2 Sheets-Sheet 1
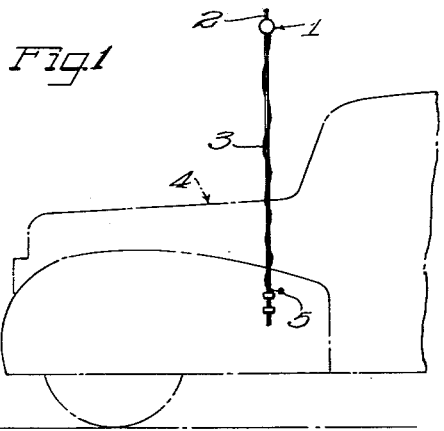
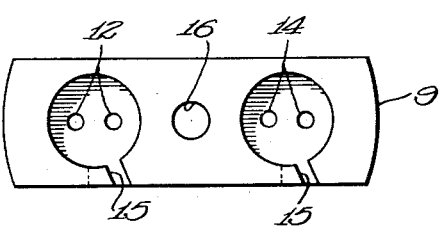
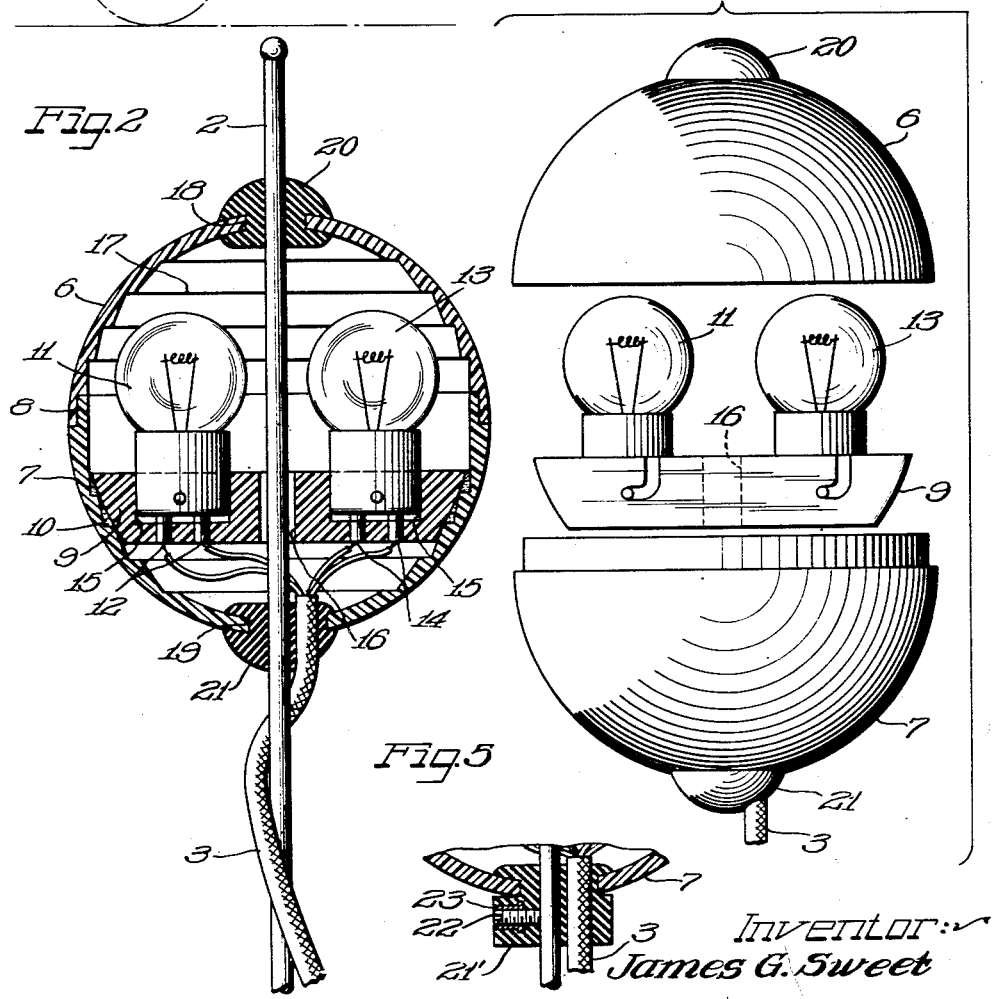
Inventor:
James G. Sweet March 22, 1955  J. G. SWEET  2,704,839
SIGNAL LIGHT
Filed Feb. 1, 1952  2 Sheets-Sheet 2
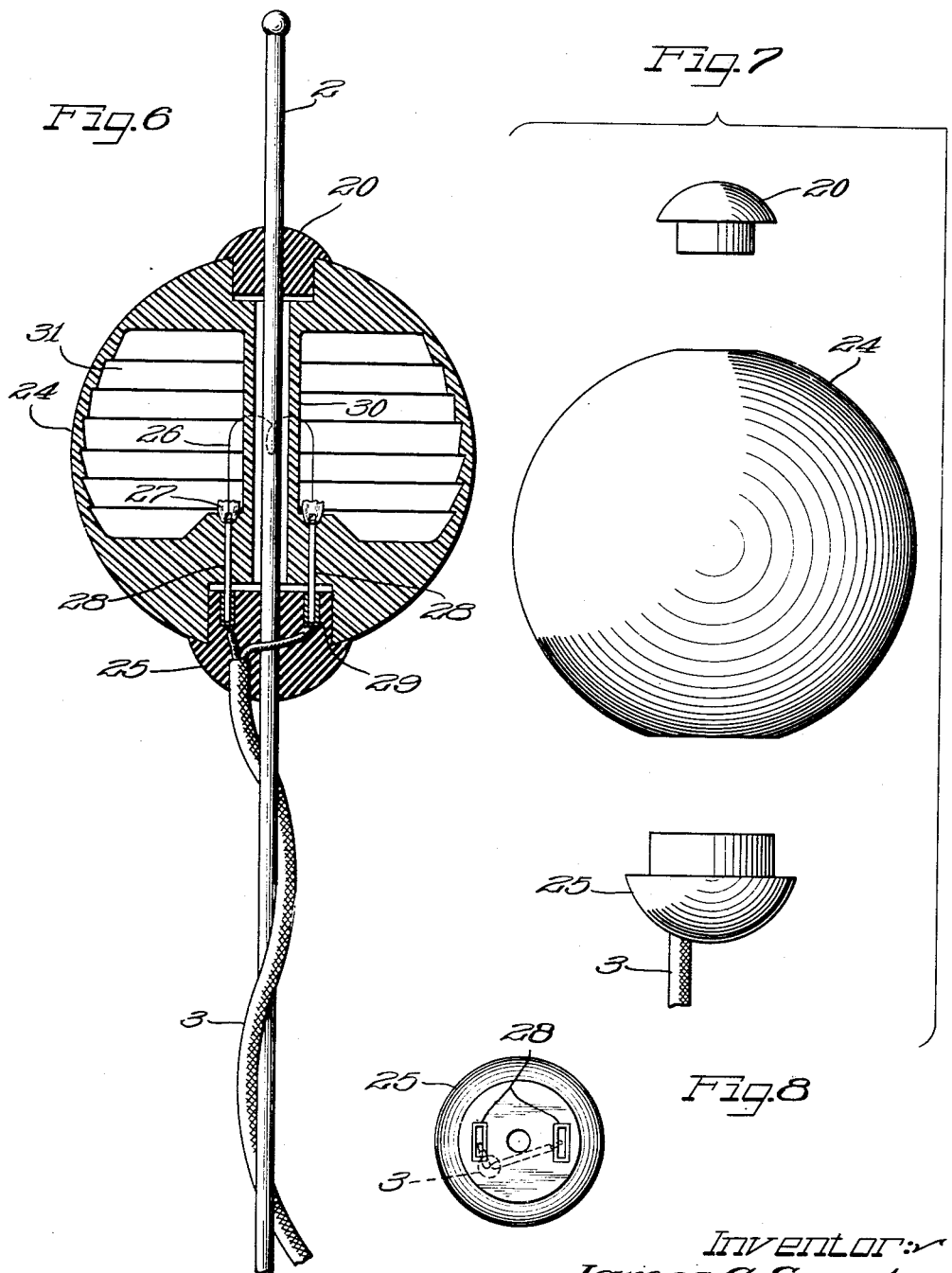
Inventor:
James G. Sweet

United States Patent Office 2,704,839
Patented Mar. 22, 1955

2,704,839

SIGNAL LIGHT

James G. Sweet, Chicago, Ill.

Application February 1, 1952, Serial No. 269,367

11 Claims. (Cl. 340—87)

This invention relates generally to signal lamp apparatus and particularly to readily adjustable signal lights adapted to be slidably mounted upon an elongated rod or cable.

While the principle of the instant invention is of general utility, a most important application is found in the field of automotive signals, for example, in automobile stop lights.

One of the major problems in the automotive safety art is the provision of adequate emergency signals such as parking or stop lights. Although advances have been made regarding size and arrangement of factory installed stop lights and other signals, a common fault remains. This is that the signals now generally in use are positioned on the automobile body such that they are visible only to the driver immediately behind and are invisible to drivers more than one automobile to the rear. This limitation in the lighting system has been an important factor in the numerous multiple automobile smash-ups in which several automobiles in a row have been demolished due to the failure of drivers in the rear to see stop lights of vehicles some distance ahead.

An object of the present invention is therefore to provide a signal light which will not be blocked from view by other vehicles.

A further object of the invention is to provide a readily visible signal which may be mounted on mechanism commonly attached to vehicles and which requires a minimum of modification of existing structures.

Yet another object is to provide a signal which corrects the above mentioned faults and which may easily be attached to automobiles or other vehicles already in use as well as such vehicles at the factory.

Other objects and advantages of the invention will be apparent from the specification and annexed drawings, in which:

Figure 1 is a view of the signal light of the present invention mounted upon the radio antenna of an automobile;

Figure 2 is a view in cross-section of one form of the signal lamp unit mounted upon an antenna;

Figure 3 is an exploded view of the assembly shown in Figure 2, showing the sequence of assembly;

Figure 4 is a plan view of the signal bulb support shown in Figures 2 and 3;

Figure 5 shows a modification of the attaching means used with the lamp globe;

Figure 6 is a view in cross section of a second form of the signal lamp unit mounted upon an antenna;

Figure 7 is an exploded view of the assembly shown in Figure 6, showing the separate elements; and Figure 8 is a plan view of the combined grommet and lamp socket shown in Figures 6 and 7.

Referring to the drawings in detail, Figure 1 shows the novel signal light 1 of the present invention mounted upon an automobile radio antenna 2. A wiring harness 3 connects the signal light 1 to appropriate signal switches within the body of the automobile 4. A suitable aperture is provided at 5 for entry of the wiring harness 3 into the automobile.

Figures 2 through 5 show further specific details of one form of the novel signal light structure generally referred to at 1, 2 and 3 above. An outer lamp body is provided by mating hemispherical portions 6 and 7, which may be separably joined at 8 by screw thread means or other similar well known expedients. Within the lower lamp body 7 is mounted the bulb supporting structure 9. While in the embodiment here shown the bulb support 9 has been glued at 10 to the lamp body 7, it is apparent that other equivalent forms of attachment could be used. The bulb support 9 has provision for two light bulbs 11 and 13 which are mounted in identical bayonet-type sockets 15. The bulbs 11 and 13 are separately energizable through the pairs of contacts 12 and 14 to which appropriate switch means are attached. An opening 16 is provided for the passage of the mounting member 2 which in the embodiment pictured is an automobile radio antenna.

The outer lamp body portions 6 and 7 are held in adjusted position on the radio antenna 2 by means of grommets 20 and 21 which are mounted in diametrically opposed apertures 18 and 19 in the body portions 6 and 7, respectively. The grommets 20 and 21 are preferably composed of a resilient material such as natural or synthetic rubber. This resiliency provides a friction grip upon the antenna 2, permitting adjustment of the signal light therealong. The resiliency of the grommets 20 and 21 also compensates for variations in size of the antenna 2, thus providing a waterproof seal at all times. While the natural resiliency of the grommets 20 and 21 provides a sufficient gripping force to maintain adjustment in most installations, an additional holding means may be provided if desired. Figure 5 shows an example of such modification, in which 22 is a set screw mounted in the member 23 which is in turn bonded to the resilient grommet 21'. The modification shown in Figure 5 is particularly useful in trucks and other commercial installations having unusually large vibrations.

The outer lamp body portions 6 and 7 are preferably formed of a translucent material. The inside surface of the lamp body is ridged or otherwise embossed as shown at 17 to form a reflecting surface. It is contemplated that the lamp body portion be made of one of the modern plastics, such as "Plexiglas" or "Tenite," although any translucent material may be used. At this point it is noted that the term translucent as herein used refers, in accordance with its broad dictionary definition, to any material which will transmit or pass light and includes, in general, all materials not classifiable as opaque or impervious to the passage of light. The material may be of any color, although red is of course preferred where the device is used as a stop light.

In the modification shown, the lamp body is of a spherical shape because of its inherent strength. However, other shapes and designs may be used if desired. For example, it has been found that construction of the lamp body in three parts, namely, a top, a center band and a bottom, is practical. In such a shape all three portions could be of translucent material or, if desired, the top and bottom portions could be metal and the center band translucent, to form a lantern effect.

In Figures 6, 7 and 8, a further embodiment of my invention is shown. Modern techniques of the glass industry have made possible the use of unusually shaped lamps, such as the so-called "sealed beam" automobile headlamp bulbs now in common use. In recognition of these advancements, I have shown my signal lamp as such a "sealed unit" in Figures 6, 7 and 8. At 24 is a sealed lamp body which performs both the functions of light source and lamp body. The filament 26 is attached to the prongs 28 and is sealed to the body material 24, at 27, in an air-tight manner. The filament is constructed to partially encircle the tubular portion 30 of the lamp body 24. The cavity 31 is evacuated during manufacture and inert gases are inserted, if desired, to provide the usual "sealed beam" lamp unit. The tubular portion 30 is shown as an integral part of the lamp glass, although it is, of course, possible to construct it of metal or other material which may be sealed or bonded to the translucent material of the body 24.

While the same upper grommet 20 is used in this modification as was used in the arrangement shown in Figures 2–5, the lower grommet 25 is somewhat changed to provide for electrical contacts 29. Preferably, the contacts 29, along with the harness 3 and the circuit wires, are molded into the rubber grommet 25 at the time of its manufacture, providing a waterproof and corrosion-resistant socket arrangement.

In assembly, the grommet 25 is slipped over the antenna and the lamp body 24 is then slid into place with the prongs 28 firmly seated in the sockets 29. The grommet 20 is then pushed into place and the whole mechanism adjusted along the antenna to the desired position.

While in the modification shown in Figures 6, 7 and 8 only one filament has been shown, it is contemplated that two or more filaments could be used if desired. Such a change requires only the use of additional prongs 28 and sockets 29.

While no electrical circuits have been shown in the drawings, it is contemplated that the light bulbs 11 and 13, or 24, be connected to sources of electricity through well known switches. For example, in Figures 2–5, the light 11 may be connected to a manual switch on the automobile dashboard while the light 13 may be placed in the usual stop light circuit, so as to operate simultaneously therewith. In Figures 6–8, the filament 26 is similarly connected in the stop light circuit.

It will be understood that modifications and variations may be effected without departing from the scope of the novel concepts of the present invention.

I claim as my invention:

1. In a signal device for use with an automobile radio antenna, a hollow translucent body comprising at least two mating portions, said portions each containing an aperture through which a support may be slidably passed, resilient friction grommet means in at least two of said apertures for frictionally holding the body in adjusted position along the support and a signal bulb affixed inside the said body to one of said portions.

2. An adjustably mounted signal device comprising a hollow translucent globe member separable into two mating portions, each portion having an aperture with a resilient grommet therein, a support rod slidably mounted through said grommets and frictionally gripped thereby, and a signal light bulb fixedly mounted within one of said mating portions.

3. An automobile signal light comprising a translucent lamp body formed of two mating separable hemispherical portions, said body having two diametrically opposed apertures, resilient bushings in said apertures for frictionally gripping a support rod, and a signal bulb fixedly mounted within one of said portions, said signal bulb being operable simultaneously with the stop light of said automobile.

4. A signal light comprising at least two hollow, mating, translucent body portions separably joined along a substantially horizontal plane, opposed apertures in said portions, a resilient grommet in each of said apertures adapted to resiliently grip a vertical support rod, a set screw mounted within at least one of said bushings adapted to positively grip said support, and a signal bulb fixedly mounted within at least one of said body portions.

5. A combined automotive stop light adapted to be mounted on the automotive radio antenna, comprising a hollow translucent lamp body having diametrically opposed apertures therein, friction gripping and sealing means comprising resilient grommets within said apertures, said means being adapted to grip said antenna, a signal filament support fixedly mounted within said lamp body and a signal light filament supported by said filament support.

6. A combined automotive stop light and emergency signal adapted to be mounted on an automotive radio antenna, comprising a hollow translucent lamp body having diametrically opposed apertures therein, friction gripping and sealing means comprising resilient grommets within said apertures, said means being adapted to grip said antenna, signal filament supports fixedly mounted within said lamp body with emergency and stop light filaments supported thereby.

7. A signal light comprising a hollow, translucent lamp body having an aperture extending completely therethrough for the passage of an antenna, incandescent means secured within said lamp body, and resilient grommet means adjustably supporting said lamp body upon said antenna.

8. A signal light comprising a hollow, translucent lamp body having an aperture extending completely therethrough for the passage of a support rod, incandescent light filament means secured to said lamp body therewithin, grommet means at each side of said lamp body in said aperture for frictionally and sealingly supporting the lamp body upon said support rod, and means for connecting said filament means to a source of electricity.

9. A signal light comprising a hollow, translucent lamp body having an opening therethrough for the passage of a support, incandescent means within said lamp body, first grommet means at the entrance of said opening into said body and second grommet means at the exit of said opening from said body, said grommet means serving to resiliently maintain said lamp body in an adjusted position on said support, and electrical current conducting means passing through one of said grommets to energize said incandescent means.

10. The structure constructed according to claim 9 wherein said incandescent means is concealed within said body from the atmosphere and said body provides a sealed lamp envelope therefor.

11. A combined automotive stop light adapted to be mounted on the automotive radio antenna, comprising a hollow translucent lamp body having diametrically opposed apertures therein, friction gripping and sealing means comprising resilient grommets within said apertures, said means being adapted to grip said antenna, a signal filament support fixedly mounted within said lamp body and a signal light filament supported by said filament support, said lamp body, filament support and filament comprising a single bonded sealed lamp unit.

References Cited in the file of this patent

UNITED STATES PATENTS

| 1,725,248 | Bradbury et al. | Aug. 20, 1929 |
| 2,168,671 | Garlington | Aug. 8, 1939 |
| 2,183,349 | Fukuhara | Dec. 12, 1939 |
| 2,229,520 | Pfingsten | Jan. 21, 1941 |
| 2,252,395 | Cohen | Aug. 12, 1941 |
| 2,366,871 | Pfingsten | Jan. 9, 1945 |
| 2,437,944 | Edwards | Mar. 16, 1949 |
| 2,586,643 | Garlow | Feb. 19, 1952 |